United States Patent
Reville et al.

(10) Patent No.: US 8,788,957 B2
(45) Date of Patent: Jul. 22, 2014

(54) SOCIAL VIRTUAL AVATAR MODIFICATION

(75) Inventors: Brendan Reville, Seattle, WA (US); Stacey Law, Redmond, WA (US); Derek Smith, Snohomish, WA (US)

(73) Assignee: Microsoft Corporation, Redmond, WA (US)

( * ) Notice: Subject to any disclaimer, the term of this patent is extended or adjusted under 35 U.S.C. 154(b) by 491 days.

(21) Appl. No.: 12/197,228

(22) Filed: Aug. 22, 2008

(65) Prior Publication Data

US 2010/0045697 A1 Feb. 25, 2010

(51) Int. Cl.
- *G06F 3/048* (2013.01)
- *G06F 3/00* (2006.01)
- *G06F 9/44* (2006.01)
- *G06F 3/0481* (2013.01)
- *G06Q 10/10* (2012.01)

(52) U.S. Cl.
CPC ............ *G06F 9/4443* (2013.01); *G06F 3/0481* (2013.01); *G06Q 10/10* (2013.01)
USPC ............................ 715/765; 715/754; 715/764

(58) Field of Classification Search
CPC ............ G06F 3/048; G06F 3/00; G06Q 10/10
USPC .................................. 715/751–760, 764, 765
See application file for complete search history.

(56) References Cited

U.S. PATENT DOCUMENTS

| | | | |
|---|---|---|---|
| 7,386,799 B1 * | 6/2008 | Clanton et al. ................ | 715/758 |
| 8,026,918 B1 * | 9/2011 | Murphy ........................ | 345/473 |
| 8,365,076 B2 * | 1/2013 | Hamilton et al. ............. | 715/706 |
| 2004/0128350 A1 | 7/2004 | Topfl et al. | |
| 2005/0143174 A1 | 6/2005 | Goldman et al. | |
| 2005/0223328 A1 | 10/2005 | Ashtekar et al. | |
| 2005/0248574 A1 * | 11/2005 | Ashtekar et al. .............. | 345/473 |
| 2006/0046699 A1 * | 3/2006 | Guyot et al. ............... | 455/414.1 |
| 2006/0293103 A1 | 12/2006 | Mendelsohn | |
| 2007/0002057 A1 * | 1/2007 | Danzig et al. ................ | 345/473 |

(Continued)

FOREIGN PATENT DOCUMENTS

JP 2007-133776 A 5/2007
KR 10-2001-0007775 A 2/2001

(Continued)

OTHER PUBLICATIONS

Marcus, T.D., "Fostering Creativity in Virtual Worlds: Easing the Restrictiveness of Copyright for User-Created Content", New York Law School Review, 2007-2008, 52, 67-92, http://www.nyls.edu/pdfs/NLRvol52-102.pdf.

(Continued)

*Primary Examiner* — Tadeese Hailu
(74) *Attorney, Agent, or Firm* — Micah Goldsmith; Judy Yee; Micky Minhas

(57) ABSTRACT

The techniques disclosed herein integrate a social aspect into avatar modification. Multiple users may access a virtual environment that allows users to modify the user's avatar. The users in the application may be any combination of remote and local players. The users' avatars may be associated with the same application or different applications. The users may interact in the same virtual environment while modifying their respective avatars. Any user in the virtual environment may view modifications that are made to other users' avatars and interact with other users while modifications are made. Thus, the techniques disclosed allow avatar modification to be a multi-player experience.

20 Claims, 6 Drawing Sheets

(56) References Cited

U.S. PATENT DOCUMENTS

| | | | |
|---|---|---|---|
| 2007/0168863 A1* | 7/2007 | Blattner et al. | 715/706 |
| 2007/0260984 A1* | 11/2007 | Marks et al. | 715/706 |
| 2007/0298866 A1 | 12/2007 | Gaudiano et al. | |
| 2008/0052242 A1 | 2/2008 | Merritt et al. | |
| 2008/0309675 A1* | 12/2008 | Fleury et al. | 345/581 |
| 2009/0158160 A1* | 6/2009 | Alberth et al. | 715/733 |
| 2009/0254859 A1* | 10/2009 | Arrasvuori et al. | 715/810 |
| 2010/0001993 A1* | 1/2010 | Finn et al. | 345/419 |

FOREIGN PATENT DOCUMENTS

| | | |
|---|---|---|
| KR | 10-2005-0091587 A | 9/2005 |
| WO | WO 02/40120 A2 | 5/2002 |
| WO | WO 2005/020129 A2 | 3/2005 |
| WO | WO 2006107182 A1 | 10/2006 |

OTHER PUBLICATIONS

Geser, H., "Me, my Self and my Avatar", Society in Switzerland towards Cybersociety and Vireal Social Relations, Apr. 2007, 16 pages, http://socio.ch/intcom/t_hgeser17.pdf.

Geser, H., "A Very Real Virtual Society", Society in Switzerland towards Cybersociety and Vireal Social Relations, May 2007, 27 pages, http://socio.ch/intcom/t_hgeser18.pdf.

PCT Application No. PCT/US2009/052808: International Search Report and the Written Opinion of the International Searching Authority, Mar. 22, 2010, 10 pages.

* cited by examiner

SOCIAL VIRTUAL AVATAR MODIFICATION

BACKGROUND

An avatar is a computer representation of a user that typically takes the form of a two-dimensional (2D) or three-dimensional (3D) model in various applications, such as computer games, video games, chats, forums, communities, instant messaging services, and the like. Most of these applications support a system for defining certain aspects of the avatar. For example, the user may define the avatar such that the avatar represents the user's actions and aspects of their persona, beliefs, interests, or social status.

Most systems that allow for the creation of an avatar also allow for customization of that character's appearance. For example, the user may customize the avatar by adding hairstyle, skin tone, body build, etc. An avatar may also be provided with clothing, accessories, emotes, animations, and the like. Some systems allow for the addition, removal, or modification of accessories or clothing worn by the avatar.

While the purpose of an avatar is typically to provide a user with a virtual identity within a social, multi-player application, the modification of an avatar is a single-player experience, typically while the user is offline. For example, the user can access a personal repository of clothing and accessories and make modifications to the avatar's appearance. These modifications are visible to the local user, but not to other users. If multiple users are using the same application, such as playing the same game, for example, when a user makes modification's to his or her avatar it is a single-player experience and the other players are not involved. Similarly, if different users are playing in different games, there is no social aspect of viewing modifications made to other user's avatars. Rather, the modifications to the avatar are not visible to any remote users until the user has confirmed and completed the modification.

Thus, the modification of a user's avatar does not have a social aspect typically thought of when contemplating the interactions of an avatar. Rather the avatar modifications are a single-player experience for both local and remote users in the same or different applications.

SUMMARY

The techniques disclosed herein integrate a social aspect into avatar modification, allowing one or more users to interact in the same virtual environment while modifying their respective avatars. The users accessing the virtual environment may be any combination of remote and local players. The users' avatars may be associated with the same application or different applications. For example, both remote and local users could be playing different games with access to a common virtual environment, such as a virtual closet or changing room, for avatar modification. The avatars may interact with each other in this common virtual environment. Items owned by other avatars and modifications made to other avatars may be visible to all users within the environment. Avatars may trade items with other avatars, try on items from another avatar's closet, suggest items to another avatar, or the like.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The foregoing Summary, as well as the following Detailed Description of illustrative embodiments, is better understood when read in conjunction with the appended drawings. For the purpose of illustrating the embodiments, there are shown in the drawings example constructions of the embodiments; however, the embodiments are not limited to the specific methods and instrumentalities disclosed. In the drawings.

DETAILED DESCRIPTION OF ILLUSTRATIVE EMBODIMENTS

Disclosed herein are techniques that integrate a social aspect into avatar modification. The subject matter of the disclosed embodiments is described with specificity to meet statutory requirements. However, the description itself is not intended to limit the scope of this patent. Rather, the claimed subject matter might also be embodied in other ways, to include elements similar to the ones described in this document in conjunction with other present or future technologies.

Embodiments are related to integrating a social aspect into the modification of avatars such that avatar modification is a multi-player experience. Each user may be represented in the virtual world by at least one avatar. The avatar may be wearing a combination of clothing and accessories associated to a user's avatar. As a result of various triggers, a user may gain access to a virtual environment that renders the user's avatar for avatar modification, such as a social avatar closet. The user may view and make changes to his or her own avatar in this social avatar closet, or the user may view and make changes to other user avatars that are rendered in the virtual environment. Users accessing the virtual environment may be any combination of local and remote users in the same or across different applications.

Figure 1:
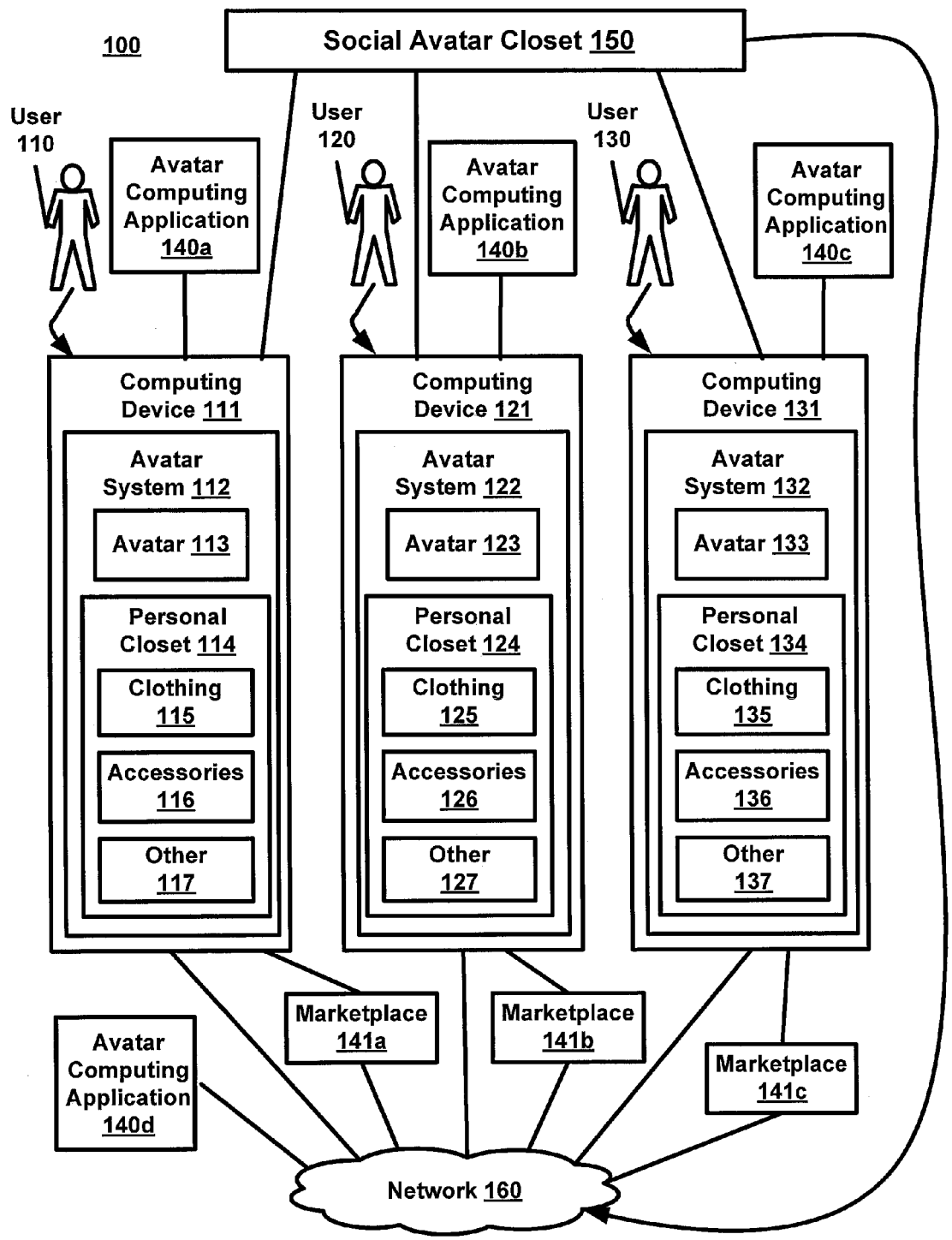
FIG. 1 shows an example of a network and computing environment in which aspects and embodiments of the techniques disclosed may be employed.

FIG. 1 shows an example of a computing environment 100 in which aspects and embodiments of the techniques disclosed herein may be employed. Computing system 100 may include a virtual social avatar closet 150, avatar computing applications 140*a*, 140*b*, 140*c*, 140*d*, marketplaces 141*a*, 141*b*, 141*c*, and computing devices 111, 121, 131. Each computing device 111, 121, 131 may have a respective avatar system 112, 122, 132 comprising an avatar 113, 123, 133, and a personal closet 114, 124, 134. Each user 110, 120, 130 may access items in the user's respective personal closet 114, 124, 134 to apply to the user's avatar 113, 123, 133. For example, the personal closet may have clothing 115, 125, 135, accessories 115, 125, 135 (e.g., handbags, sunglasses, earrings, wallets, shoes), or other items 117, 127, 137 (e.g., emotes, animations).

The users 110, 120, and 130 may access and interact with components of the computing system 100 via a computing device 111, 121, 131 such as avatar computing applications 140a, 140b, and 140c. Each computing device 111, 121, 131 may have an associated user 110, 120, 130 and may run one or more avatar computing applications 140a, 140b, 140c, 140d that may be a computer game or other application that renders or otherwise uses an avatar, such as 113, 123, 133. For example, an avatar computing application 140a, 140b, 140c, 140d may be a computer game, video game, chat, forum, community, instant messaging, or the like. A computing device 111, 121, 131 may be a multimedia console, a personal computer (PC), a gaming console, a handheld computing device, a PDA, a mobile phone, or the like. A single computing device, such as 111, may also support multiple users and multiple avatar systems and, it is contemplated that each avatar system, such as 112, 122, and 132, may maintain any number of avatars.

Although FIG. 1 only illustrates three computing devices 111, 121, and 131 with associated with respective users 110, 120, and 130, respectively, it is contemplated that the computing system 100 may have any number and any combination of computing devices and associated users. Similarly, although only four avatar computing applications 140a, 140b, 140c, 140d are illustrated in FIG. 1, it is contemplated that any number of avatar computing applications may be accessible via a computing device. Any number or combination of avatar computing applications may provide, create, or expose any number or combination of avatars.

As shown in FIG. 1, a social avatar closet 150, computing devices 111, 121, 131, marketplaces 141a, 141b, 141c, and avatar computing applications 140a, 140b, 140c, 140d may communicate with one another by way of a network 160. Multiple users may connect remotely and/or locally over network 160 to create a multi-player experience, sometimes accessing the same avatar computing applications via a computing device. For example, network 160 could be an online gaming service such as XBOX Live, and computing devices 111, 121, and 131 could be XBOX game consoles that execute the same game from XBOX Live over the XBLOX Live connection. Alternately, the users 110, 120, and 130 could be local users plugged into the same computing device or connected computing devices that have a LAN connection, for example. The network 160 may include, for example, an intranet, an internetwork, the Internet, a personal area network (PAN), a campus area network (CAN), a local area network (LAN), a wide area network (WAN), a gaming network, or the like. The network 160 may also represent the technology that connects individual devices in the network, such as optical fibre, wireless LAN, Ethernet, power line communications, or the like.

Most systems that allow for the creation of an avatar also allow for customization of that character's appearance. Each personal closet 114, 123, 134 may represent the repository of items owned and associated with a particular avatar 113, 123, 133 but not currently applied to the avatar. For example, the personal closets 114, 124, 134 may comprise a user interface for allowing the users 110, 120, and 130 to view and modify the clothing 115, 125, 135, the set of accessories 116, 126, and 136, and/or the other items 117, 127, 137 applied to the user's avatar 113, 123, and 133. The other items 117, 127, 137, may include options for customizing the avatar 113, 123, 133, such as options for hairstyle, skin tone, body build, emotes, animations, or the like. The marketplaces 141a, 141b, and 141c may provide access to items that a user can try on, or buy (i.e., places to "go shopping"). Each marketplace may be specific to a user or a computing application, for example, or they could be open to any users in the network 160. However, as modifications are made via this interface, the user 110, 120, 130 is provided with a display of the user's avatar 113, 123, 133 that is separate from what other users see.

The personal closets 114, 124, 134 may reside in a respective multimedia console 111, 121, and 131 as system software and be available to the particular user such as 110, 120, or 130 at any time across any application 140a, 140b, 140c, 140d. Thus, the user interface for avatar modification may also be available to the respective user at any time. For example, the user 110 may be playing any game or executing any program and access an interface to the user's personal closet. The user's avatar 113 modification is a single-player experience, where only the user 110 of the avatar 113 accesses the interface for viewing and making any modifications. Following the user's avatar 113 modification, a signal indicative of the modification may be sent to other computing devices 121, 131 or avatar computing applications 140a, 140b, 140c, 140d on the network that are rendering the avatar 113 that has been modified. In this manner, the modification may be made available to other users 120, 130 in the network 160.

A common virtual environment, such as the social avatar closet 150, on the other hand, provides a shared closet such that multiple users 110, 120, 130 may have access to view modifications made to other users' avatars and interact with each other during the avatar modification experience. An avatar 113, 123, 124, along with its personal closet 114, 124, 134, may be system provided and omnipresent. Similar to a single avatar's interface to a personal closet 114, 124, 134 that may be provided to the respective user 110, 120, 130 at any time for avatar modification, multiple avatars 113, 123, 133 may have access to the social avatar closet 150 at any time, regardless of the avatar computing application, if any, is in use by any particular user 110, 120, 130. Thus, the social avatar closet 150 may render the avatars of any combination of local and remote users that are executing the same or different applications (or none at all).

A modification may be made to a user's avatar and other users may be able to view the modifications as they are occurring, before the modification is confirmed and statically applied to the avatar. Rather than a user interface accessible by a single user, where modifications made to the avatar are not visible until after the user exits the environment, a user interface may be available to multiple users to participate in avatar modification (e.g., a social avatar closet 150). For example, a user 110 may access a user interface that overlays an executing avatar computing application 140a currently providing a display on the user's computing device 111. Rather than the user 110 making various modifications and those modifications not being visible to other users 120, 130 on the network unless and until the user 110 confirms the modification and exits the user interface, the user interface may be accessible by multiple users 120, 130 such that the modifications may be visible prior to the confirmation of any modification. The other users 120, 130 may be those executing the same avatar computing application 140a or those that are locally or remotely connected to the user.

Via the social avatar closet 150, multiple users 110, 120, 130 may interact with other users' avatars or with other users 110, 120, 130 via the social avatar closet 150. Thus, a user 110, for example, may participate in the modification of an other user's (120) avatar 123 by viewing the changes, making modifications to the other user's avatar 123, or communicating with the other user 120 or other users, such as 130, in the virtual environment. For example, from within the social avatar closet 150, users 110, 120, 130 may view other avatar modifications, make or suggest modifications to other avatars, trade or borrow clothing or accessories from other avatars, purchase items from other avatars' personal closets, trade or borrow with another avatar, chat with other users regarding desirable modifications, poll other users regarding an appropriate accessory, or the like.

The social avatar closet 150 may be software that is maintained remotely from the computing devices 111, 121, 131 or the associated users 110, 120, 130. In this manner, the social avatar closet 150 may be available to multiple users 110, 120, 130 across any of the components of computing system 100 via a remote connection. Alternately, the social avatar closet 150 may be system software that is not system-wide but rather associated with specific computing devices or specific users, where a select number of connected users may access a shared social avatar closet 150. In this manner, the social nature of the social avatar closet 150 may be limited to a smaller number of users. For example, the social avatar closet 150 may be accessibly by only users 110 and 120, but not by 130.

In whatever manner the users 110, 120, 130 connect to the social avatar closet 150 and interact with each other, they may share items from their personal closets 114, 124, 134 or access items via the social avatar closet 150. The social avatar closet 150 may be a repository of items that users 110, 120, 130 can access when connected, leaving items behind or taking items from the social avatar closet 150 The taking of items may be a borrow and return system, like a library, or it may require purchase, an exchange with another user in the social avatar closet 150, or the like. Other avatars, such as 123 and 133 may give clothing to another avatar 113, put clothes on the avatar 113, or suggest clothes to the user 110 of the avatar, for example. The avatars 113, 123, 133 can try on clothing and accessories before making a purchase. Users 110, 120, 130 may trade items between personal closets 114, 124, 134, allowing one user to purchase or trade items from other users.

Computing system 100 provides a user 110, 120, 130 with access to items that are not already owned by the avatar 113, 123, 133, such as clothing or accessories stored in a personal closet 114, 124, 134, for example, or those accessible from the social avatar closet 150. The social avatar closet 150 may provide access to marketplaces, such as 141a, 141b, 141c, such that the users 110, 120, 130 can "go shopping" together and access, try items on and model items for each other, soliciting comments before making any purchases or confirming the application of any modification. If a user, such as 110, accesses a marketplace 141a, 141b, 141c, other users, such as 120, 130, that want to interact during avatar modification may access the same social avatar closet 150. In this manner, any user's avatars 113, 123, 133 in the social avatar closet 150 may "try on" other users' clothing and accessories or items from the marketplaces 141a, 141b, 141c for demonstration purposes. An avatar computing application 140a, 140b, 140c, 140d may also provide access to clothing, accessories, or other items. For example, if the avatar computing application 140a, 140b, 140c, 140d is a game, an avatar may win or lose an accessory as a result of a success or failure in a particular level of the game. When a user 110, 120, 130 selects items from the social avatar closet 150, that item may become a part of the avatar's personal closet 114, 124, 134 and accessible by the user 110, 120, 130 at any time.

Any number of triggers may result in the modification of an avatar's appearance from the social avatar closet 150. A trigger may be a request by any user, such as 110, 120, or 130, instructions from an avatar computing application, or updates provided by software associated with any one of the multimedia consoles 111, 121, and 131. For example, a user 110 may receive an item as a gift or another user 120, 130 may offer help in updating the appearance of the user's avatar 113. The avatars 113, 123, and 133 may be changed by a system or computing application associated with the computing devices 111, 121, and 131 or associated with the computing system 100 as a whole. For example, a message from a game 140d may trigger entry into the social avatar closet 150 when the user 120 achieves an accomplishment in the game 140d associated with a new item. The accomplishment may be, for instance, beating a level or purchasing an item in the game 140d with game-currency. The trigger may be the result of an occurrence outside of a computer game or computing environment in which the avatar 112, 122, or 132 may be rendered or used by user 110, 120, or 130. The trigger may place the user's avatar 113, 123, 133 into that user's personal closet 114, 124, 134, or it could place the user's avatar 113, 123, 133 in the social avatar closet 150 such that the changes may be experienced with other user input.

Although FIG. 1 shows one social avatar closet 150 any number of social avatar closets may exist in a computing system 100. There may be both public and private social avatar closets 150 and restrictions may be set for access to the social avatar closet 150. For example, entry into a social avatar closet 150 may be limited to invitation only, similar to how users are invited into a multiplayer game. In this manner, only select users may have the right to invite another user into the restricted social avatar closet 150. Similarly, the social avatar closet 150 may be specific to a computing application program 140a, 140b, 140c, 140d such that only users 110, 120, 130 of the application can enter that particular social avatar closet 150. For example, if users 110 and 120 are using computing application program 140a, there may be a social avatar closet 150 specific to that computing application program 140a that is only entered when the users 110 and 120 are using that computing application program 140a.

Alternately the social avatar closet 150 may be public and accessible by anyone who is remotely or locally connected across the same network. For example, the avatar computing application 140a could be a virtual world that mimics a community. A user 110, 120, 130 may enter a clothing store in the virtual world 140a and have the option to make the "shopping" experience a social one by entering a social avatar closet 150. The social aspect of this social avatar closet 150 may be open to any users 110, 120, 130 connected to the network 160, or alternately, it could be limited to only the other avatar's who are in the clothing store or in the virtual world.

The user 110, 120, 130 may select which closet he or she wishes to use for a particular experience. A user 110, 120, 130 may wish to enter the social avatar closet 150 to get advice about how a particular item looks, to seek advice as to what accessory may work for them in a particular avatar computing application, such as 140a, 140b, 140c, 140d or look at the items left by other users 110, 120, 130 to borrow, purchase, or trade, for example. Alternately, the user 110, 120, 130 may wish to limit the social aspect of an avatar modification, such as in the case where a modification is part of the user's strategy for the particular avatar computing application he or she is accessing.

The level of access to the items in the social avatar closet 150 may also be limited by restrictions. For example, individual users 110, 120, 130 may limit access by others to their personal closets 114, 124, 134 when they are in the social avatar closet 150. The user 110, 120, 130 may select those items that he or she would like for other users 110, 120, 130 to view or have access to for trade or purchase, and hide other items he or she wants to keep private.

The user interface of the personal closets 115, 125, 135 and the social avatar closet 150 may not interfere with the underlying software (e.g., an avatar computing application 140a, 140b, 140c, 140d) that is executing, apart from notifying the underlying software when the personal closet 114, 124, 134 or social avatar closet 150 is being provided to the user 110, 120, 130 or when it is being closed. The personal closets 115, 125, 135 and the social avatar closet 150 may provide notification to the software when the accessories or other expressions of functionality for a particular avatar 113, 123, 133 have changed. The notification may update the social avatar closet 150 and or a user's personal closet 114, 124, 134 such that the clothing, accessories, and other items stored in the respective closets 114, 124, 134 reflect any updates.

Figure 2:
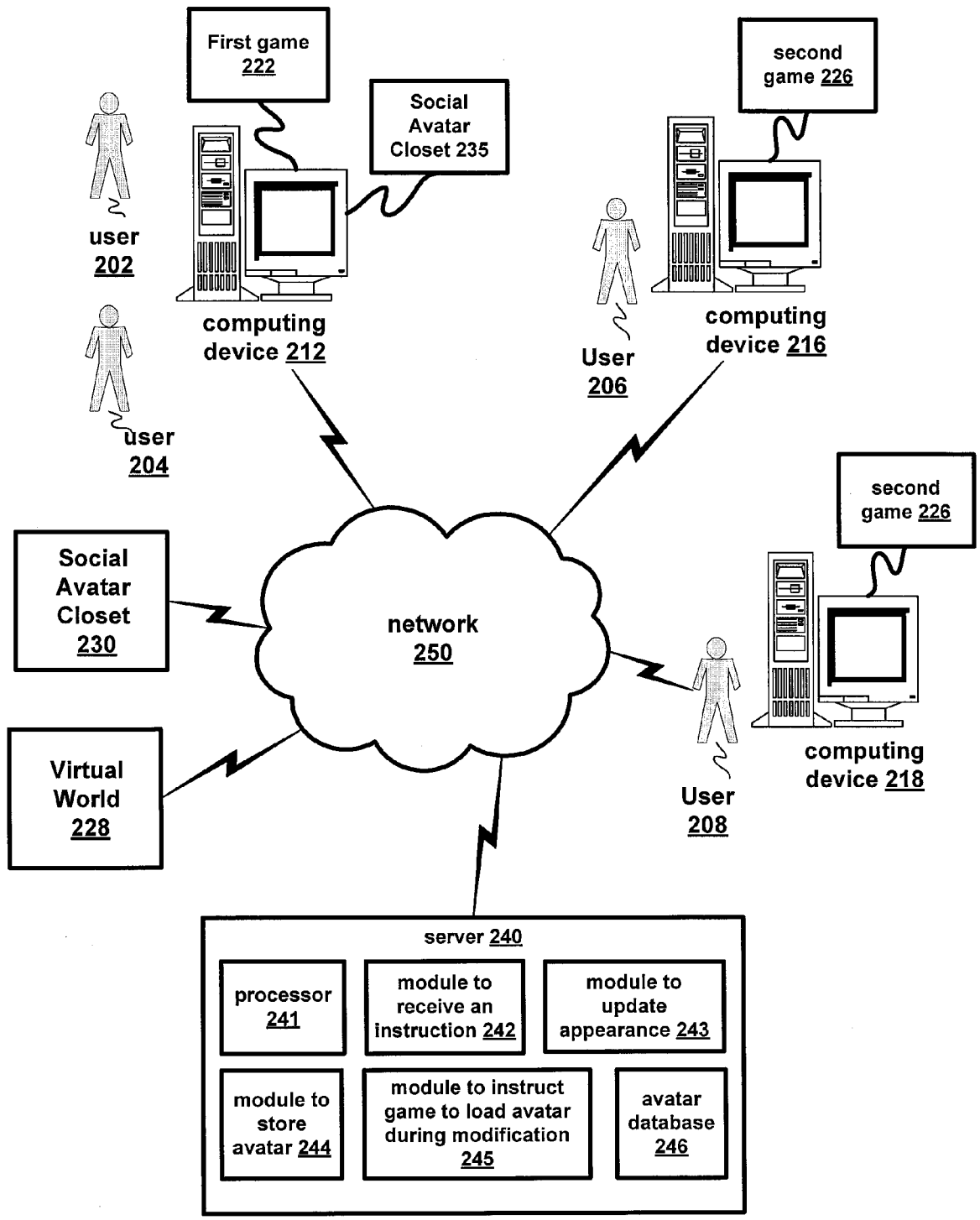
FIG. 2 shows another example of a network and computing environment in which aspects and embodiments of the techniques disclosed may be employed.

FIG. 2 depicts an example computing system 200 that provides a multi-player social experience for avatar modification between multiple users across multiple computing applications. The system includes both locally and remotely connected users 202, 204, 206, 208, computing devices 212, 216, 218 each associated with at least one user 202, 204, 206, 208, an avatar computing application local to each user 202, 204, 206, 208, shown as first and second games 222, 226, 228, an avatar computing application that is remote to each of the users 202, 204, 206, 208, shown as virtual world 228, a social avatar closet 230, and a server 240. The server 240 comprises a processor 241, a module to receive an instruction to update the appearance of the avatar 242, a module to update the appearance of the avatar 243, a module to store the updated avatar 244, a module to instruct the user's game to load and display the updated avatar 245, and a database in which to store an avatar/user pairs 246.

As indicated in FIG. 2, a single computing device 212 may support multiple users 202, 204. Thus, users 202 and 204 are locally connected to each other but also remotely connected via network 250 to users 206 and 208. The example system disclosed is illustrative and different implementations are also contemplated. The computing devices 212, 216, 218 may be similar to computing devices 111, 121, 131, illustrated in FIG. 1. For example, each computing device may be a dedicated video game console or a more general computing device, such as a cellular telephone or a personal computer. The computing devices 212, 216, 218 may be configured to execute a plurality of games. They may each have an optical drive and allow for a variety of games to be executed from computer readable instructions stored on optical discs. The games may be stored on a storage device within each computing device, such as a hard drive or solid-state drive.

Each user 202, 204, 206, 208 may have one or more avatars to use in an avatar computing application 222, 226, 228, each with access to items from their personal closet, such as 114, 124, 134, to make avatar modifications. Any of the users 202, 204, 206, 208 may access the remote social avatar closet 230. Users 202 and 204, locally connected via computing device 212, may also share access to a private social avatar closet 235. Similarly, as described with respect to FIG. 1, any number of social avatar closets 230 could be part of the computing system 200 and be shared by select users with access based on various restrictions.

The users 202, 204, 206, 208 may modify his or her avatar while playing a computer game 222, 226 or in another computing application or environment, such as virtual world 228, that renders or otherwise uses the avatar. In this embodiment of the present disclosure, users 202, 204 may connect to an online gaming server 240 through a network 250, playing a first game 222 via an online gaming network (e.g., XBOX Live). Alternately, either of the locally connected users 202 and 204 may connect over a network 250 to a virtual world 228 via computing device 212. User 206, via computing device 216, is playing a second game 226 or may connect over a network 250 to a virtual world 228 via computing device 216. User 208, via computing device 218, is also playing the second game 226 (i.e., users 206 and 208 are both playing the same game) and could connect over a network 250 to a virtual world 228 via computing device 218.

A computer game, such as first game 222, may render a user's avatar, and while the game 222 is executing, a user 202 could access the user's avatar's personal closet and make modifications in a single-player experience. Similarly, the user 202 could access a social avatar closet 230 to make modifications in a multi-player experience. The social avatar closet 230 provides a shared closet that multiple avatars may enter, and the associated user 202, 204, 206, 208 may view modifications as they are being made to each avatar. Similar to a single avatar's access to a personal closet that may be provided to the respective user 202, 204, 206, 208 at any time, multiple avatars may have access to a social avatar closet 230 at any time, regardless of what avatar computing application 222, 226, 228, 230 is in use by any particular user 202, 204, 206, 208. Thus, users 202, 204, 206, and 208 could all be in a shared social avatar closet 230 and interact with each other. For example, even though user 208 is running a second game 226, the user may interact with any of users 202, 204, or 206 in the social avatar closet, regardless of what application any of the users 202, 204, or 206 are running.

Any number of triggers may result in the modification of an avatar's appearance from the social avatar closet 230. A trigger may be a request by any user, such as 202, 204, 206, 208 instructions from an avatar computing application 222, 226, 228, or updates provided by software associated with any one of the computing devices 212, 216, 218. For example, a user 202 may receive an item as a gift or another user 204, 206, or 208 may offer help in updating the appearance of the user's avatar. The avatars may be changed by a system or computing application 222, 226, 228 associated with the computing devices 212, 216, 218 or associated with the computing system 100 as a whole. For example, a message from a first game 222 may be trigger an avatar modification when the user 204 achieves an accomplishment in the game associated with a new item. The accomplishment may be, for instance, beating a level or purchasing an item in the game with game-currency. The trigger may be the result of an occurrence outside of a computer game or computing environment in which the avatar 202, 204, 206, 208 may be rendered or used by user 202, 204, 206, 208. The trigger may place the user's avatar into that user's personal closet, or it could place the user's avatar in the social avatar closet 230 such that the changes can be experienced with other user input.

A trigger may result in issuing an instruction to the server 240 to update the appearance of the avatar over the network. A module to receive an instruction may receive the instruction and update the appearance of the avatar. The module to receive an instruction 242 may pass the instruction to the module to update the appearance of the avatar 243. When the appearance of the avatar has been updated, a signal may be sent from that module 243, to the module to store the updated avatar 244, which stores said avatar in the database 246. The database 246 may store pairs that identify the user and said avatar. Where a user may have a plurality of avatars at one time, the database may store the user and the avatars separately, along with an indication of which avatar corresponds to which user. The module to update the appearance of the avatar 243 may also send a signal to the module to instruct the user's game to load and display the avatar during modification 245, which sends a message to any of the connected user's computing devices 212, 216, 218 to instruct the games 222, 226, and virtual world 228 to load and display the updated avatar and the modifications as they are occurring if the avatar is rendered in any of those environments.

Figure 3:
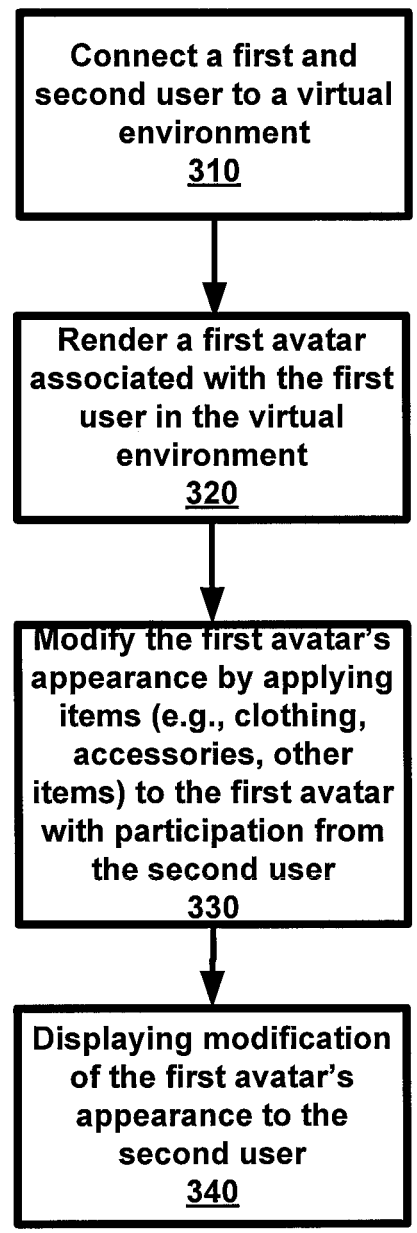
FIG. 3 is an operational flow of an implementation for enabling interaction between multiple users in a common virtual environment.

FIG. 3 illustrates an example operational flow for modifying an avatar in a social environment. Those skilled in the art will note that the disclosed process is illustrative and that different implementations are contemplated.

At 310 a first and second user connect to a virtual environment. For example, remote users may connect to a network and a network server may provide access to a virtual environment such as a social avatar closet. This connection may result from any number of triggers, as described above. A computing device, server, or the like, may render the first avatar in the virtual environment. At 330, a user may make modifications to the first avatar's appearance. The user making the modifications may be any user connected to the virtual environment. For example, from FIG. 2, a second user such as 206 in the virtual environment may be viewing the first avatar associated with a first user 202 on the second user's 206 computing device. The second user may apply items to the first avatar and interact with the first user. The second user may also communicate with the first user about the modifications made by the first user or any other users in the virtual environment regarding any avatars rendered in the virtual environment.

At 340, the computing devices associated with the various users may display the avatar during the modification. Where the item comprises a hat, said displaying may comprise applying the hat to the avatar for display purposes such that other users can see the avatar wear the hat on his or her head. Where the item is a non-clothing accessory, such as a fly swatter or a giant foam "We're #1" novelty hand, said displaying may comprise having the avatar holding or otherwise manipulating the item where the avatar is displayed. Other users may interact with the first user, commenting on the proposed modification or making suggestions for modifications.

In an example embodiment, the first user is playing in an online multi-player game. The second user is playing in an online virtual world. In such an embodiment, the display of the avatar with the modification at 340 includes directing the system of each other user to display the avatar with the item while the users are in the social avatar closet. This will cause each other user who is in the virtual world with the user to see the modifications made to the avatar.

In an embodiment, said directing the first user's game to display the avatar with the item includes directing the first game to download the item from at least one server. In an architecture where all items are stored on a server, and a subset of the items are stored on the user's computing device, the first game may require local access to the item.

An avatar may exist across the entire computing system 100, so while an item may be obtained in the first game, it is available for the avatar in all other aspects of the service. Where the user obtains an item for his or her avatar, directs that his or her avatar be displayed with the item, then begins playing a second game that supports avatars, the avatar may be displayed with the item in the second game, as well.

Figure 4:
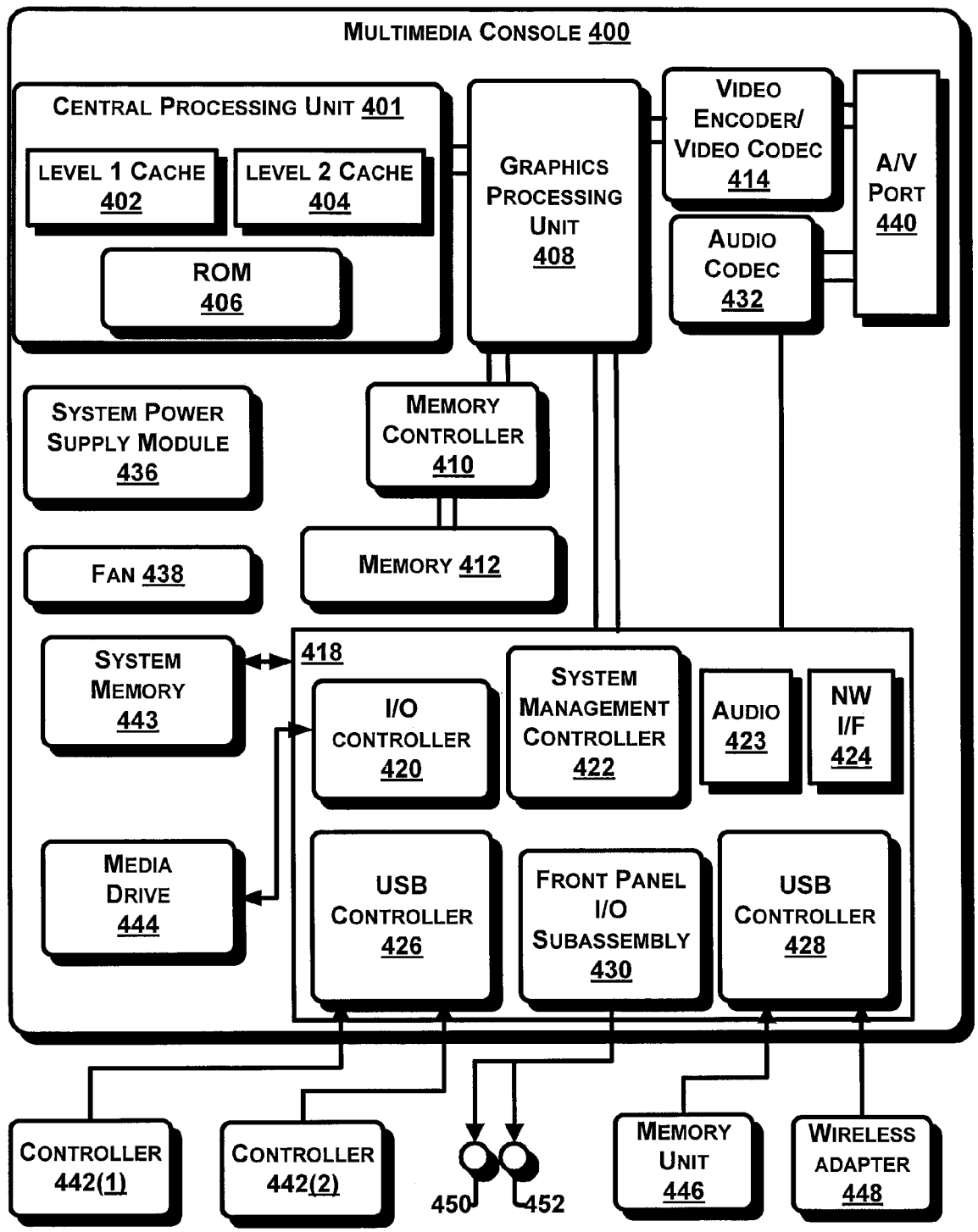
FIG. 4 illustrates functional components of an example multimedia console for use with the presently disclosed subject matter.
Figure 5:
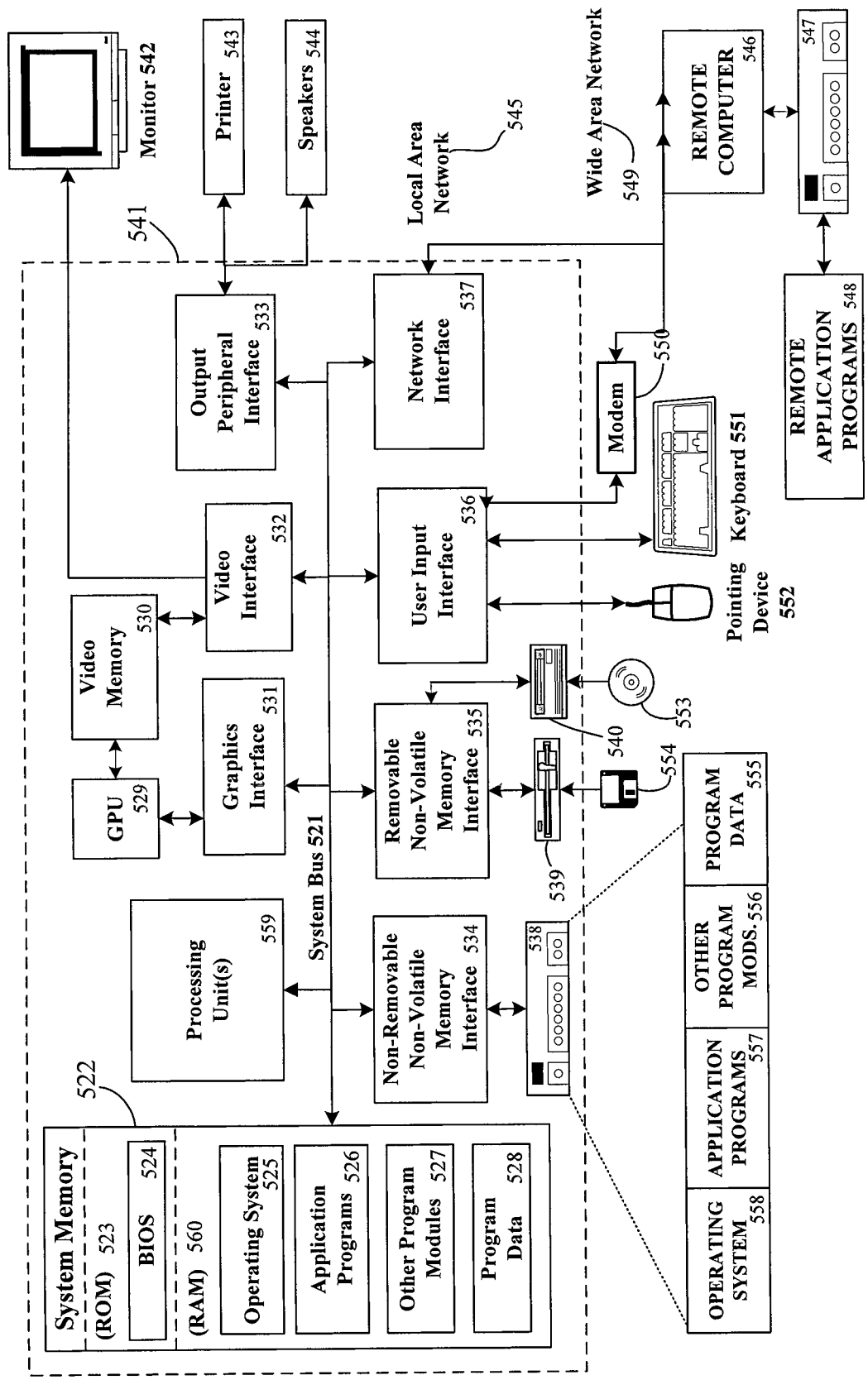
FIG. 5 illustrates functional components of an example computing environment for use with the presently disclosed subject matter.
Figure 6:
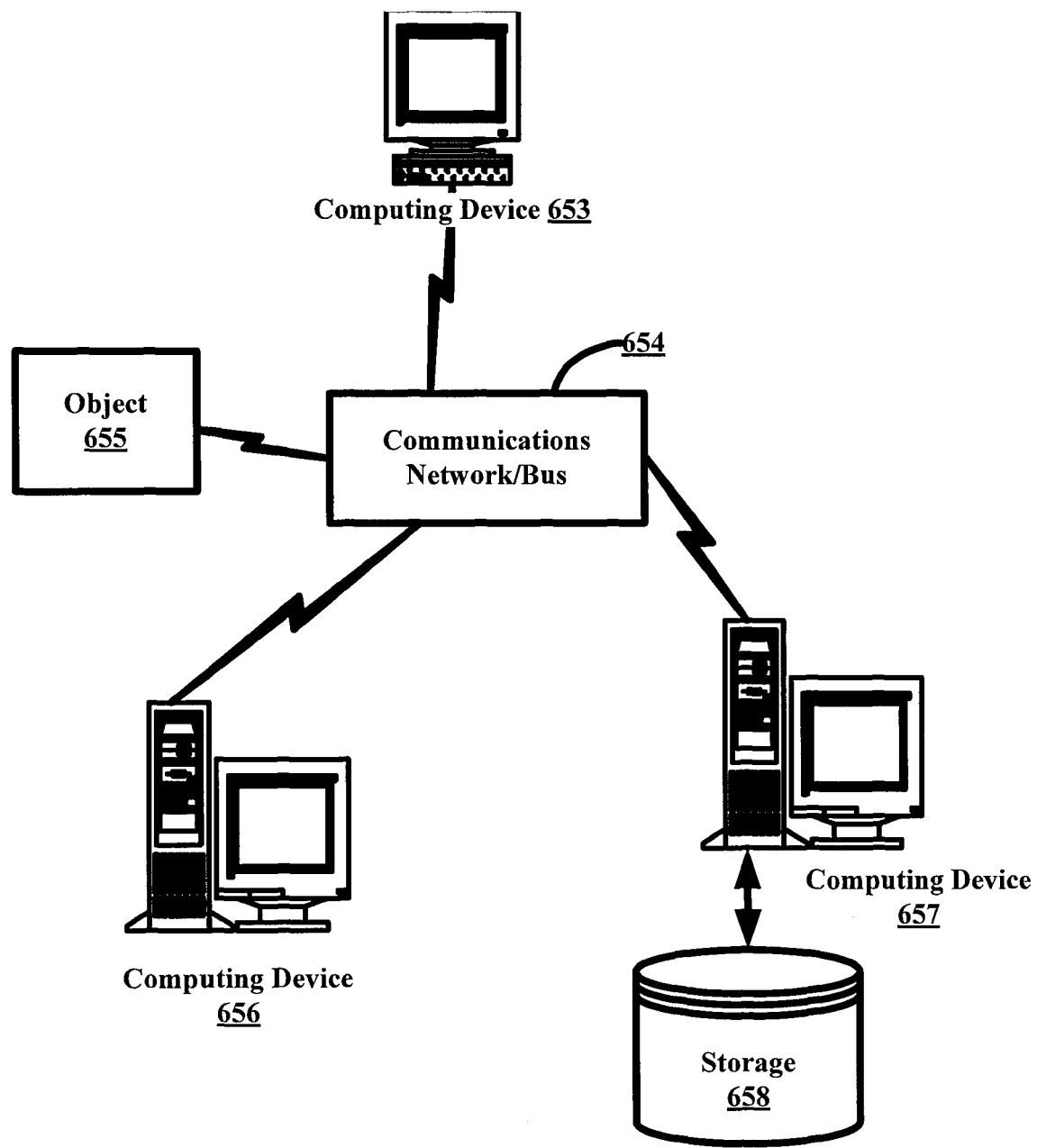
FIG. 6 illustrates functional components of an example networking environment for use with the presently disclosed subject matter.

FIGS. 4, 5, and 6 provide the general aspects of an exemplary and non-limiting game console that a user may use for avatar modification. Referring now to FIG. 4, a block diagram shows a computing device. As shown in FIG. 4, the computing device may be a multimedia console 400, for example, with a central processing unit (CPU) 401 having a level 1 (L1) cache 402, a level 2 (L2) cache 404, and a flash ROM (Read-only Memory) 406. The level 1 cache 402 and level 2 cache 404 temporarily store data and hence reduce the number of memory access cycles, thereby improving processing speed and throughput. The flash ROM 406 may store executable code that is loaded during an initial phase of a boot process when the multimedia console 400 is powered. Alternatively, the executable code that is loaded during the initial boot phase may be stored in a flash memory device (not shown). Furthermore, ROM 406 may be located separate from CPU 401.

A graphics processing unit (GPU) 408 and a video encoder/video codec (coder/decoder) 414 form a video processing pipeline for high speed and high resolution graphics processing. Data is carried from the graphics processing unit 408 to the video encoder/video codec 414 via a bus. The video processing pipeline outputs data to an ANV (audio/video) port 440 for transmission to a television or other display. A memory controller 410 is connected to the GPU 408 and CPU 401 to facilitate processor access to various types of memory 412, such as, but not limited to, a RAM (Random Access Memory).

The multimedia console 400 includes an I/O controller 420, a system management controller 422, an audio processing unit 423, a network interface controller 424, a first USB host controller 426, a second USB controller 428 and a front panel I/O subassembly 430 that are preferably implemented on a module 418. The USB controllers 426 and 428 serve as hosts for peripheral controllers 442(1)-442(2), a wireless adapter 448, and an external memory unit 446 (e.g., flash memory, external CD/DVD ROM drive, removable media, etc.). The network interface 424 and/or wireless adapter 448 provide access to a network (e.g., the Internet, home network, etc.) and may be any of a wide variety of various wired or wireless interface components including an Ethernet card, a modem, a Bluetooth module, a cable modem, and the like.

System memory 443 is provided to store application data that is loaded during the boot process. A media drive 444 is provided and may comprise a DVD/CD drive, hard drive, or other removable media drive, etc. The media drive 444 may be internal or external to the multimedia console 400. Application data may be accessed via the media drive 444 for execution, playback, etc. by the multimedia console 400. The media drive 444 is connected to the I/O controller 420 via a bus, such as a Serial ATA bus or other high speed connection (e.g., IEEE 1394).

The system management controller 422 provides a variety of service functions related to assuring availability of the multimedia console 400. The audio processing unit 423 and an audio codec 432 form a corresponding audio processing pipeline with high fidelity, 3D, surround, and stereo audio processing according to aspects of the present disclosure described above. Audio data is carried between the audio processing unit 423 and the audio codec 426 via a communication link. The audio processing pipeline outputs data to the ANV port 440 for reproduction by an external audio player or device having audio capabilities.

The front panel I/O subassembly 430 supports the functionality of the power button 450 and the eject button 452, as well as any LEDs (light emitting diodes) or other indicators exposed on the outer surface of the multimedia console 400. A system power supply module 436 provides power to the components of the multimedia console 400. A fan 438 cools the circuitry within the multimedia console 400.

The CPU 401, GPU 408, memory controller 410, and various other components within the multimedia console 400 are interconnected via one or more buses, including serial and parallel buses, a memory bus, a peripheral bus, and a processor or local bus using any of a variety of bus architectures.

When the multimedia console 400 is powered on or rebooted, application data may be loaded from the system memory 443 into memory 412 and/or caches 402, 404 and executed on the CPU 401. The application may present a graphical user interface that provides a consistent user experience when navigating to different media types available on the multimedia console 400. In operation, applications and/or other media contained within the media drive 444 may be launched or played from the media drive 444 to provide additional functionalities to the multimedia console 400.

The multimedia console 400 may be operated as a standalone system by simply connecting the system to a television or other display. In this standalone mode, the multimedia console 400 may allow one or more users to interact with the system, watch movies, listen to music, and the like. However, with the integration of broadband connectivity made available through the network interface 424 or the wireless adapter 448, the multimedia console 400 may further be operated as a participant in a larger network community. In this latter scenario, the console 400 may be connected via a network to a server.

Second, now turning to FIG. 5, illustrated is a block diagram representing an exemplary computing device that may be suitable for use in conjunction with implementing the subject matter disclosed above. Numerous embodiments of the present disclosure may execute on a computer. For example, the computer executable instructions that carry out the processes and methods for providing PC experiences on gaming consoles may reside and/or be executed in such a computing environment as shown in FIG. 1. The computing system environment 520 is only one example of a suitable computing environment and is not intended to suggest any limitation as to the scope of use or functionality of the presently disclosed subject matter. Neither should the computing environment 520 be interpreted as having any dependency or requirement relating to any one or combination of components illustrated in the exemplary operating environment 520. In some embodiments the various depicted computing elements may include circuitry configured to instantiate specific aspects of the present disclosure. For example, the term circuitry used in the disclosure can include specialized hardware components configured to perform function(s) by firmware or switches. In other examples embodiments the term circuitry can include a general purpose processing unit, memory, etc., configured by software instructions that embody logic operable to perform function(s). In example embodiments where circuitry includes a combination of hardware and software, an implementer may write source code embodying logic and the source code can be compiled into machine readable code that can be processed by the general purpose processing unit. Since one skilled in the art can appreciate that the state of the art has evolved to a point where there is little difference between hardware, software, or a combination of hardware/software, the selection of hardware versus software to effectuate specific functions is a design choice left to an implementer. More specifically, one of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer.

Computer 541 typically includes a variety of computer readable media. Computer readable media can be any available media that can be accessed by computer 541 and includes both volatile and nonvolatile media, removable and non-removable media. The system memory 522 includes computer storage media in the form of volatile and/or nonvolatile memory such as read only memory (ROM) 523 and random access memory (RAM) 560. A basic input/output system 524 (BIOS), containing the basic routines that help to transfer information between elements within computer 541, such as during start-up, is typically stored in ROM 523. RAM 560 typically contains data and/or program modules that are immediately accessible to and/or presently being operated on by processing unit 559. By way of example, and not limitation, FIG. 5 illustrates operating system 525, application programs 526, other program modules 527, and program data 528.

The computer 541 may also include other removable/non-removable, volatile/nonvolatile computer storage media. By way of example only, FIG. 5 illustrates a hard disk drive 538 that reads from or writes to non-removable, nonvolatile magnetic media, a magnetic disk drive 539 that reads from or writes to a removable, nonvolatile magnetic disk 554, and an optical disk drive 540 that reads from or writes to a removable, nonvolatile optical disk 553 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 538 is typically connected to the system bus 521 through an non-removable memory interface such as interface 534, and magnetic disk drive 539 and optical disk drive 540 are typically connected to the system bus 521 by a removable memory interface, such as interface 535.

The drives and their associated computer storage media discussed above and illustrated in FIG. 5, provide storage of computer readable instructions, data structures, program modules and other data for the computer 541. In FIG. 5, for example, hard disk drive 538 is illustrated as storing operating system 558, application programs 557, other program modules 556, and program data 555. Note that these components can either be the same as or different from operating system 525, application programs 526, other program modules 527, and program data 528. Operating system 558, application programs 557, other program modules 556, and program data 555 are given different numbers here to illustrate that, at a minimum, they are different copies. A user may enter commands and information into the computer 541 through input devices such as a keyboard 551 and pointing device 552, commonly referred to as a mouse, trackball or touch pad. Other input devices (not shown) may include a microphone, joystick, game pad, satellite dish, scanner, or the like. These and other input devices are often connected to the processing unit 559 through a user input interface 536 that is coupled to the system bus, but may be connected by other interface and bus structures, such as a parallel port, game port or a universal serial bus (USB). A monitor 542 or other type of display device is also connected to the system bus 521 via an interface, such as a video interface 532. In addition to the monitor, computers may also include other peripheral output devices such as speakers 544 and printer 543, which may be connected through a output peripheral interface 533.

The computer 541 may operate in a networked environment using logical connections to one or more remote computers, such as a remote computer 546. The remote computer 546 may be a personal computer, a server, a router, a network PC, a peer device or other common network node, and typically includes many or all of the elements described above relative to the computer 541, although only a memory storage device 547 has been illustrated in FIG. 5. The logical connections depicted in FIG. 5 include a local area network (LAN) 545 and a wide area network (WAN) 549, but may also include other networks. Such networking environments are commonplace in offices, enterprise-wide computer networks, intranets and the Internet.

When used in a LAN networking environment, the computer 541 is connected to the LAN 545 through a network interface or adapter 537. When used in a WAN networking environment, the computer 541 typically includes a modem 550 or other means for establishing communications over the WAN 549, such as the Internet. The modem 550, which may be internal or external, may be connected to the system bus 521 via the user input interface 536, or other appropriate mechanism. In a networked environment, program modules depicted relative to the computer 541, or portions thereof, may be stored in the remote memory storage device. By way of example, and not limitation, FIG. 5 illustrates remote application programs 548 as residing on memory device 547. It will be appreciated that the network connections shown are exemplary and other means of establishing a communications link between the computers may be used.

FIG. 6 provides a schematic diagram of an exemplary networked or distributed computing environment. The environment comprises computing devices 653, 656, and 657 as well as object 655 and database 658. Each of these entities 653, 655, 656, 657, and 658 may comprise or make use of programs, methods, data stores, programmable logic, etc. The entities 653, 655, 656, 657, and 658 may span portions of the same or different devices such as PDAs, audio/video devices, MP3 players, smart phones, DVD players, cable box tuners, or just about any computing devices capable of remote content provided by server PCs. Each entity 653, 655, 656, 657, and 658 can communicate with another entity 653, 655, 656, 657, and 658 by way of the communications network 654. In this regard, any entity may be responsible for the maintenance and updating of a database 658 or other storage element.

This network 654 may itself comprise other computing entities that provide services to the system of FIG. 1 or FIG. 2, and may itself represent multiple interconnected networks. In accordance with an aspect of the presently disclosed subject matter, each entity 653, 655, 656, 657, and 658 may contain discrete functional program modules that might make use of an API, or other object, software, firmware and/or hardware, to request services of one or more of the other entities 653, 655, 656, 657, and 658.

It can also be appreciated that an object, such as 655, may be hosted on another computing device 656. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wired or wireless systems, by local networks or widely distributed networks. Currently, many networks are coupled to the Internet, which provides an infrastructure for widely distributed computing and encompasses many different networks. Any such infrastructures, whether coupled to the Internet or not, may be used in conjunction with the systems and methods provided.

A network infrastructure may enable a host of network topologies such as client/server, peer-to-peer, or hybrid architectures. The "client" is a member of a class or group that uses the services of another class or group to which it is not related. In computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. Any entity 653, 655, 656, 657, and 658 can be considered a client, a server, or both, depending on the circumstances. And, moreover, regarding the entertainment console, it can be a client to a server.

A server is typically, though not necessarily, a remote computer system accessible over a remote or local network, such as the Internet. The client process may be active in a first computer system, and the server process may be active in a second computer system, communicating with one another over a communications medium, thus providing distributed functionality and allowing multiple clients to take advantage of the information-gathering capabilities of the server. Any software objects may be distributed across multiple computing devices or objects.

Client(s) and server(s) communicate with one another utilizing the functionality provided by protocol layer(s). For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over a communications medium, e.g., client(s) and server(s) may be coupled to one another via TCP/IP connection(s) for high-capacity communication.

In light of the diverse computing environments that may be built according to the general framework provided in FIG. 3 and the further diversification that can occur in computing in a network environment such as that of FIG. 3, the systems and methods provided herein cannot be construed as limited in any way to a particular computing architecture or operating system. Instead, the presently disclosed subject matter should not be limited to any single embodiment, but rather should be construed in breadth and scope in accordance with the appended claims. Thus, for example, although game consoles and server PCs have been discussed, just as easily full desktops could be remoted to smart phones as a means to access data and functionality that is otherwise unavailable to smart phones.

Finally, it should also be noted that the various techniques described herein may be implemented in connection with hardware or software or, where appropriate, with a combination of both. Thus, the methods, computer readable media, and systems of the presently disclosed subject matter, or certain aspects or portions thereof, may take the form of program code (i.e., instructions) embodied in tangible media, such as floppy diskettes, CD-ROMs, hard drives, or any other machine-readable storage medium, where, when the program code is loaded into and executed by a machine, such as a computer, the machine becomes an apparatus for practicing the subject matter.

In the case of program code execution on programmable computers, the computing device may generally include a processor, a storage medium readable by the processor (including volatile and non-volatile memory and/or storage elements), at least one input device, and at least one output device. One or more programs that may utilize the creation and/or implementation of domain-specific programming models aspects of the present disclosure, e.g., through the use of a data processing API or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

What is claimed:

1. A method of social avatar modification, the method comprising:
    rendering a first avatar in a virtual environment on a first computing device having a first user interface, the first avatar being associated with a first user;
    receiving from the first user interface an instruction indicative of a modification of the first avatar;
    sending data indicative of the modification of the first avatar via a network to a second computing device;
    receiving, in response to the data indicative of the modification, data from the second computing device indicative of a second modification of the first avatar by a second user;
    receiving, from the first user, an indication that the second modification of the first avatar associated with the first user that is made by the second user has been confirmed by the first user; and
    applying the modification statically to the first avatar.

2. The method of claim 1, further comprising:
    applying the modification to the first avatar for rendering the first avatar and the modification external to the first user interface.

3. The method of claim 1, further comprising:
    rendering the first avatar and the modification in the virtual environment on the first computing device for display to the first user, and sending data via a network for rendering the first avatar and the modification in the virtual environment on the second computing device for display to the second user.

4. The method of claim 1, further comprising:
    storing data pertaining to the modification to a current state of the first avatar on a plurality of computing devices during the modification.

5. The method of claim 1, wherein modifying the first avatar comprises:
    applying at least one of the following to the first avatar: an emote, an animation, an item of clothing, an expression, an accessory, or a physical trait.

6. The method of claim 1, wherein the data indicative of the modification includes data for rendering and displaying the modification on a second computing device, and wherein the data received from the second computing device comprises data indicating one or more of an, instant message, a second modification, a borrowing modification, a trading modification, or a giving modification, said borrowing, trading or giving comprising modifying the first avatar with virtual items associated with a second avatar.

7. The method of claim 1, further comprising:
    receiving, from the second user or a third user, data indicative of a third modification of the first avatar;
    sending a computing device associated with a third user an indication to display the first avatar modified to reflect the third modification;
    after sending the computing device associated with the third user an indication to display the first avatar modified to reflect the third modification, receiving, from the first user, an indication of the first user not confirming the third modification; and
    in response to receiving, from the first user, an indication of the first user not confirming the third modification, sending the computing device associated with the third user an indication to display the first avatar without the first avatar being modified to reflect the third modification.

8. A system of social avatar modification, comprising:
    a processor;
    a memory coupled to a processor, the memory bearing instructions that, when executed by the processor, cause the system at least to:
        render a first avatar in a virtual environment on a first computing device having a first user interface, the first avatar associated with a first user;
        receive from the first user interface an indication indicative of a modification of the first avatar;
        send data indicative of the modification of the first avatar via a network to a second computing device;
        receive, in response to the data indicative of the modification, data from the second computing device indicative of a second modification of the first avatar by a second user;
        receive, from the first user, an indication that the second modification of the first avatar associated with the first user that is made by the second user has been confirmed by the first user; and
        apply the modification statically to the first avatar.

9. The system of claim 8, wherein the memory further bears instructions that, when executed by the processor, cause the system at least to:
    apply the modification to the first avatar for rendering the first avatar and the modification external to the first user interface.

10. The system of claim 8, wherein the memory further bears instructions that, when executed by the processor, cause the system at least to:
    render the first avatar and the modification in the virtual environment on the first computing device for display to the first user, and rendering the first avatar and the modification in the virtual environment on the second computing device for display to the second user.

11. The system of claim 8, wherein the memory further bears instructions that, when executed by the processor, cause the system at least to:
    store data pertaining to the modification to a current state of the first avatar on a plurality of computing devices during the modification.

12. The system of claim 8, wherein the instructions that, when executed by the processor, cause the system at least to modify the first avatar further cause the system at least to:
    apply at least one of the following to the first avatar: an emote, an animation, an item of clothing, an expression, an accessory, or a physical trait.

13. The system of claim 8, wherein the indication indicative of the modification includes data for rendering and displaying the modification on a second computing device, and wherein the data received from the second computing device comprises data indicating one or more of an, instant message, a second modification, a borrowing modification, a trading modification, or a giving modification, said borrowing, trading or giving comprising modifying the first avatar with virtual items associated with a second avatar.

14. The system of claim 8, wherein the modification of the first avatar is selected from a predetermined set of modifications.

15. A computer readable storage medium for social avatar modification, bearing computer executable instructions that when executed on a computer, cause the computer to perform operations comprising:
rendering a first avatar in a virtual environment on a first computing device having a first user interface, the first avatar associated with a first user;
receiving from the first user interface an instruction indicative of a modification of the first avatar;
sending data indicative of the modification of the first avatar via a network to a second computing device;
receiving, in response to the data indicative of the modification, data from the second computing device indicative of a second modification of the first avatar by a second user;
receiving, from the first user, an indication that the second modification of the first avatar associated with the first user that is made by the second user has been confirmed by the first user;
applying the modification statically to the first avatar; and
applying the modification to the first avatar for rendering the first avatar and the modification external to the first user interface, the computer readable storage medium further comprising instructions for sending information indicative of rendering the modification in an external avatar computing application.

16. The computer readable storage medium of claim 15, wherein the indication indicative of the modification includes data for rendering and displaying the modification on a second computing device, and wherein the data received from the second computing device comprises data indicating one or more of an, instant message, a second modification, a borrowing modification, a trading modification, or a giving modification, said borrowing, trading or giving comprising modifying the first avatar with virtual items associated with a second avatar.

17. The computer readable storage medium of claim 15, further bearing computer executable instructions that, when executed on the computer, cause the computer to perform operations comprising:
rendering the first avatar and the modification in the virtual environment on the first computing device for display to the first user, and sending data via a network for rendering the first avatar and the modification in the virtual environment on the second computing device for display to the second user.

18. The computer readable storage medium of claim 15, further bearing computer executable instructions that, when executed on the computer, cause the computer to perform operations comprising:
storing data pertaining to the modification to a current state of the first avatar on a plurality of computing devices during the modification.

19. The computer readable storage medium of claim 15, wherein modifying the first avatar comprises:
applying at least one of the following to the first avatar: an emote, an animation, an item of clothing, an expression, an accessory, or a physical trait.

20. The computer readable storage medium of claim 15, wherein the modification of the first avatar is selected from a predetermined set of modifications.

\* \* \* \* \*